Oct. 14, 1958  J. G. LINDEMAN  2,856,016
CONDUIT AND REEL STRUCTURE FOR REMOTE CONTROL POWER SYSTEM
Filed Dec. 16, 1955  2 Sheets-Sheet 1

*INVENTOR.*
J. G. LINDEMAN

Oct. 14, 1958          J. G. LINDEMAN          2,856,016
CONDUIT AND REEL STRUCTURE FOR REMOTE CONTROL POWER SYSTEM
Filed Dec. 16, 1955          2 Sheets-Sheet 2
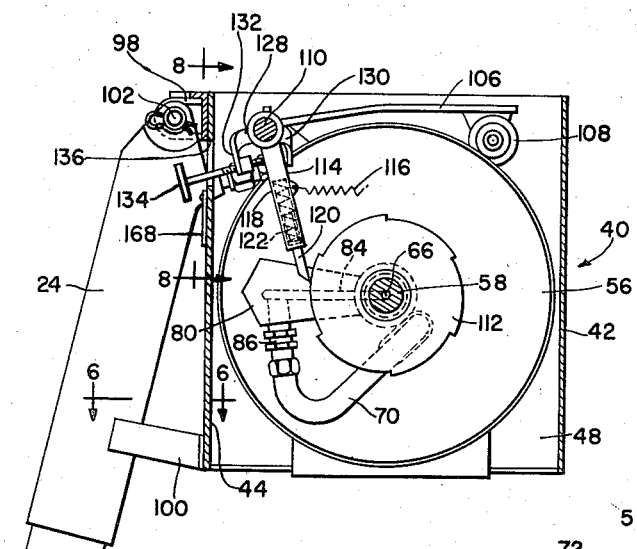
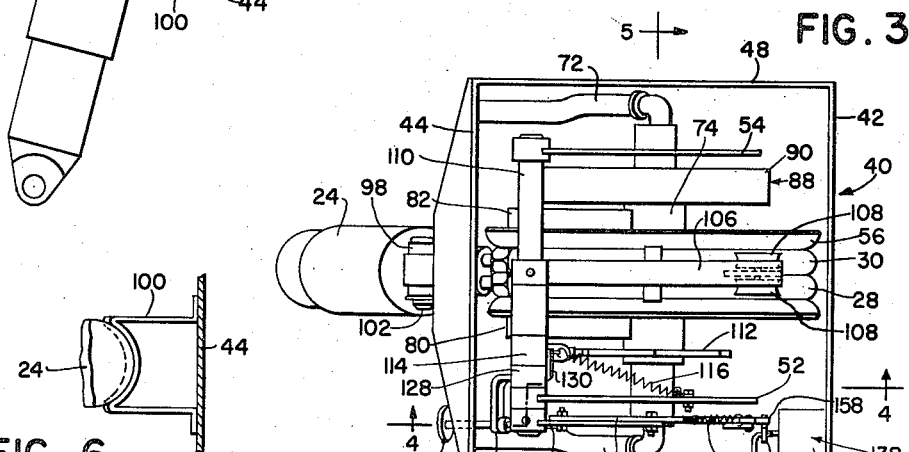
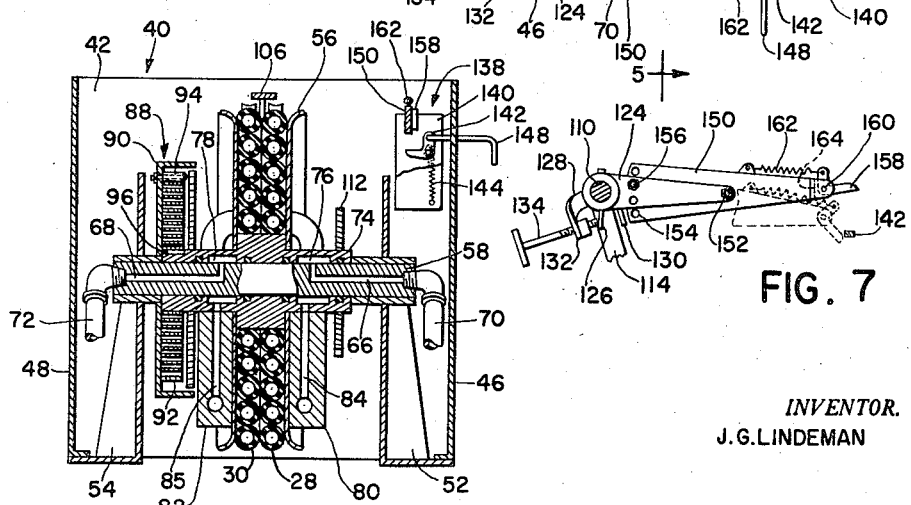
INVENTOR.
J. G. LINDEMAN United States Patent Office 2,856,016
Patented Oct. 14, 1958

2,856,016

CONDUIT AND REEL STRUCTURE FOR REMOTE CONTROL POWER SYSTEM

Jesse G. Lindeman, Yakima, Wash., assignor, by mesne assignments, to Deere & Company, a corporation of Delaware Application December 16, 1955, Serial No. 553,656

16 Claims. (Cl. 180—14.5)

This invention relates to a remote control power system and more particularly to a reel and conduit arrangement by means of which power-transfer conduit may be selectively payed out and reeled to and from a point remote from the main power system.

The invention finds practical utility in the agricultural field in the reeling and unreeling of hydraulic hose by means of which hydraulic power is transmitted from a power unit on the tractor to implements and other mechanisms relatively remote from the tractor. In a typical situation, the tractor has a hydraulic power system including one or more fluid pressure outlets to which hoses are connected for transmitting the effects of the fluid pressure to a fluid-pressure-receiving device on the implement, such as a fluid motor for adjusting an implement part. Because of the articulate interconnection between the tractor and the implement, a certain amount of hose must be used, which hose is either allowed to hang in catenary form or is otherwise supported by means that will yield when the tractor and implement occupy different levels on the terrain. In those cases in which the implement is deliberately disconnected from the tractor, provision must be made for the storage of the hose, either on the implement or on the tractor. Preferably, the hose and the fluid motor should remain with the tractor, so that the tractor can be used with other implements without requiring the addition of extra fluid motors and hoses. As far as is known, there has heretofore been made no convenient provision for hose and hydraulic motor storage on the tractor, which has led to several problems which are aggravated because of the requirement that hoses of different lengths are needed with different implements, because the distances between the tractor power system and the hydraulic motor mounting point on the implement vary from implement to implement. Thus, the user must either purchase hoses of several lengths or must utilize a compromise length which requires, in close-coupled tractor-implement arrangements, that the excess hose be suitably supported.

According to the present invention, these and other problems are eliminated by the provision on the tractor of a reel on which a maximum length of hose is normally coiled in storage form. The arrangement is such that any amount of hose short of the maximum can be unreeled to accommodate the particular tractor-implement arrangement. That is to say, in close-coupled instances, a relatively short length of hose may be utilized and in those instances in which the power device on the implement is farther from the tractor than in close-coupled cases, more hose is available. Thus, the owner has a widely flexible arrangement enabling the use of the same hose and same hydraulic motor, if desired, with a substantial variety of implements and other machines. It is a feature of the invention that the re-winding action of the reel is such that it may be selectively set to permit only the necessary amount of hose to extend between the tractor and implement. This mechanism is adjustable to vary the amounts of hose for other implements. The invention features further provision of means for cutting out operation of the tractor in the event that the connection between the tractor and implement fails for one reason or other, thus preventing damage to the hose or power system as the tractor travels forwardly without the implement. It is an object of the invention to provide a conduit and reel arrangement that is useful as an attachment to tractors of existing types, without requiring material alterations in the basic tractor structure. Still further objects of the invention reside in novel means for storing the hydraulic cylinder connected to the hose or hoses; the provision of means for over-riding the automatic operation of the reel, whereby to permit full winding action so as to return the hose to its storage status; and the provision of a simple and economical design that will be substantially universal in use with implements and other machines of known types.

The foregoing and other important objects and desirable features inherent in and encompassed by the invention will become apparent as a preferred embodiment thereof is disclosed in detail in the ensuing specification and accompanying sheets of drawings, the several figures of which will be described below.

Fig. 3 is a plan view, with the tractor seat removed, of the structure shown in Fig. 2.

Fig. 4 is a section as seen on the line 4—4 of Fig. 3.

Fig. 5 is a section as seen on the line 5—5 of Fig. 3, with the reel rotated 90° so as to show the hose connections.

Fig. 6 is a section as seen on the line 6—6 of Fig. 4.

Fig. 7 illustrates the operation of the actuating means for controlling forward travel of the tractor.

Figure 1:
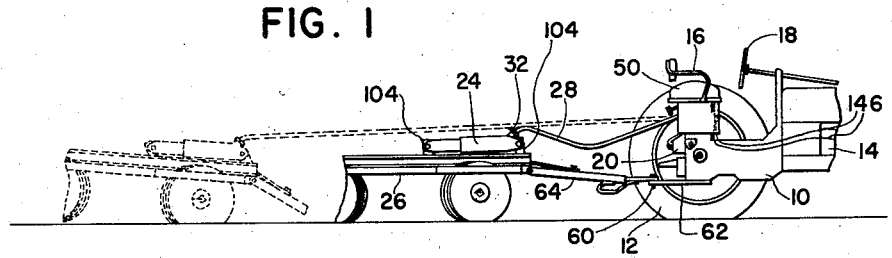
Fig. 1 is a side elevation, with portions broken away, showing in full lines the normal operating relationship between a tractor and one kind of implement, the view illustrating in dotted lines a position in which the implement and tractor are separated.
Figure 2:
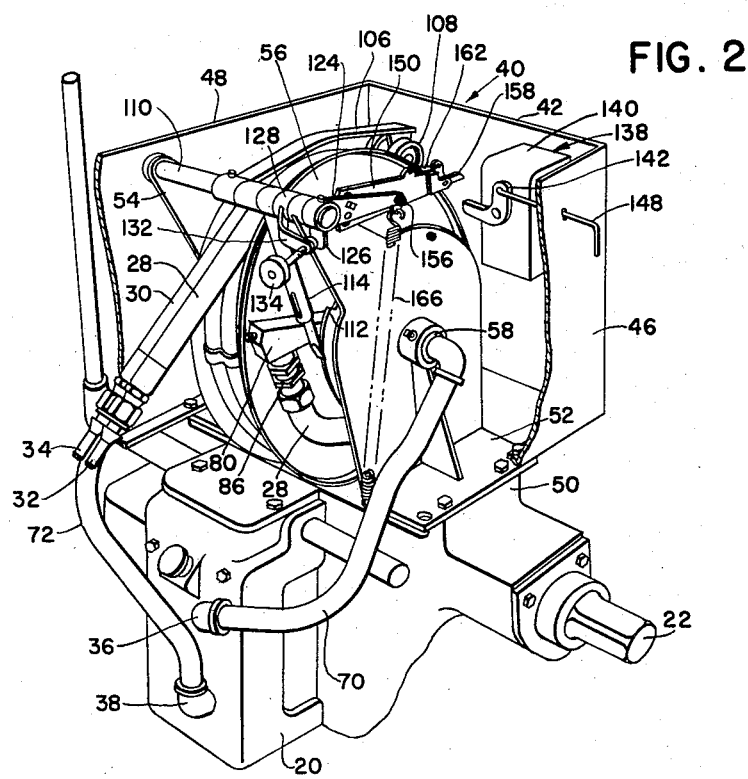
Fig. 2 is a fragmentary perspective, on a scale enlarged over that of Fig. 1, showing the reel and conduit arrangement.

In Fig. 1, the numeral 10 designates the main body of a typical agricultural tractor, the right hand traction wheel of which has been removed and the left hand traction wheel 12 of which is visible. The tractor is powered by driving mechanism including a power plant such as an internal combustion engine 14 and the tractor is controlled from an operator's station 16, ahead of which is located a steering wheel 18 for tractor front wheels (not shown). The tractor is of the type in which the rear body portion includes an integral power system, preferably hydraulic and of the type shown in the U. S. patent to Jirsa et al. 2,532,552. As characteristic of that system, the rear part of the body 10 of the tractor is integrated with the hydraulic power lift system and includes a basic valve housing 20 which contains valve mechanism (not shown) for selectively operating either an internal cylinder (not shown) for controlling a rockshaft 22 or a remote cylinder such as that shown at 24 for use with a variety of implements having adjustable parts, typical of which is the disk harrow 26 shown in Fig. 1. Power control of the rockshaft 22 is usually characteristic of the operation of implements mounted on or directly connected to the tractor. Use of the remote power-receiving device or hydraulic motor 24 is characteristic of implements that are drawn or otherwise disposed relatively remote from the tractor. In such cases, the cylinder, as at 24 here, must be supplied with hydraulic fluid from the tractor power system, here of the hydraulic type, by power-transfer conduit, here in the form of a pair of hydraulic hoses 28 and 30. The motor 24 is of the two-way type and therefore the two hoses 28 and 30 are used. It will be understood, of course, that only one hose will be used with a one-way system. The hoses 28 and 30 have free ends provided with quick-connectible couplers 32 and 34, respectively, for connection to the cylinder 24. The cylinder 24 is typical of that design in which both hoses are connected to one end of the cylinder; although, the cylinder includes an internal passage by means of which fluid transmitted by one hose is directed to the other end of the cylinder, thus giving the motor its two-way characteristic. In Fig. 2, the arrangement is shown with the cylinder 24 removed from the hose couplings 32 and 34. In a typical arrangement known prior to the present invention, the opposite ends of the hoses are connected to the valve box 20, as by means of suitable connections made to fluid-pressure outlets such as those shown at 36 and 38. The adaptation of the basic system to the present invention will become apparent as the description proceeds.

In a tractor of the character illustrated, the operator's station 16 includes a box-like supporting structure 40 having front and rear walls 42 and 44, respectively and right hand and left hand side walls 46 and 48, respectively. These walls form support for a seat cushion, which cushion is removed in Fig. 2 so as to expose the interior structure. The rear portion of the tractor body 10, and particularly that portion that houses the rockshaft 22 and supports the valve box 20, normally serves as means for supporting the box-like structure 40 and therefore has appropriate mounting pads such as that visible at 50 in Fig. 2, it being understood that there are a pair of similar pads. These are utilized to carry upright right and left hand supports 52 and 54, which supports are located within the box-like structure 40, as are a reel 56 and a transverse reel journal or shaft 58. The hoses 28 and 30 are wound or coiled on the reel 56 in a maximum length sufficient to reach from the reel to any implement of a character capable of use with the tractor. In the present case, the harrow 26 is one of the more closely coupled types and consequently only a portion of the maximum length of hose will extend thereto. An implement such as the harrow is normally separably connected by a removable pin 60 received between a draw-bar 62 on the tractor and a tongue 64 on the implement. The connection at 60—62—64 is separable in the sense that the pin 60 may be deliberately removed to enable separation of the tractor from the implement and also in the sense that under overload the pin 60, for example, may break, in which case the separation will be inadvertent or accidental. It will therefore be appreciated that the distance between the tractor and the implement may accidentally increase and if the tractor continues without the implement, the hose extending between the tractor and the implement will be placed in tension to such extent as to cause rupture thereof or damage to other parts of the power system. Provision safe-guarding against accidents of this nature will be discussed below.

The reel shaft 58 is internally hollow so as to afford right and left hand fluid chambers 66 and 68, respectively, and these are connected by right and left hand fluid lines 70 and 72 to the valve box fluid outlets 36 and 38, respectively. By this means, the reel shaft is connected to the tractor power system and it remains only to connect this part of the structure to the hoses 28 and 30. This is accomplished by the provision of a reel hub 74 which has right and left hand chambers 76 and 78 which lead respectively to hose connection passages in right and left hand hub enlargements 80 and 82. These passages appear at 84 and 85, respectively (Fig. 6). The reel-proximate ends of the hoses 28 and 30 are respectively coupled to the enlargements so as to be in respective communication with the internal passages, a typical coupling being shown at 86 in Fig. 4. The arrangement is such that free rotation of the reel may be had without any complications being introduced by the hose connections; that is to say, the fixed hoses 70 and 72 communicate with the passages 66 and 68, respectively, in the fixed shaft 58, whereas the reel-carried hoses 28 and 30 may be paid out and reeled in as the reel rotates, since they are connected to the hub enlargements 80 and 82 which, because of the chambers 76 and 78, are in constant communication with the shaft passages or chambers 66 and 68, respectively.

The reel 56 is energized for re-wind rotation by re-wind means designated in its entirety by the numeral 88. This means includes a drum 90, fixed to the left hand support 54, and a clock-type spring 92 having one end fixed at 94 to the drum 90 and its other end fixed at 96 to the left hand end portion of the reel hub 74. Thus, as the reel rotates in a pay-out direction (counterclockwise as view in Figs. 1 and 4, for example), the spring 92 stores energy available to drive the reel in a reverse or re-wind direction.

As shown in Fig. 2, the hoses 28 and 30 may be coiled in a storage status on the reel 56 in such manner as to leave their free ends, represented by the couplings 32 and 34, exposed at the rear of the tractor, the rear wall of the seat box having an aperture therein (not shown) through which the free ends of the hose may extend. As shown in Fig. 4, the free ends may be exposed and may have the power-receiving device or motor 24 secured thereto, in which case the motor is carried by the seat box 40 in a convenient storage position, which is accomplished by the provision of an upper hanger 98 and a lower bracket or rest 100. The hanger 98 has opposite apertured ears which removably receive a mounting pin 102 which is passed through the clevis on the cylinder end of the motor. The bracket 100 is shaped as shown in Fig. 6 so that the lower portion of the cylinder may nest partially therein. Regardless of whether the free ends of the hoses are considered with or without the motor 24, the hoses are nevertheless stored on the reel 56 and are available for extension to a remote location upon pay-out rotation of the reel 56. In any event, the remote location is represented here by the implement 26. In the harrow, chosen for purposes of illustration, there are a pair of fore-and-aft spaced apart mounting portions 104 which respectively receive the cylinder and piston of the motor 24. Thus, as the motor is extended or retracted, the harrows are angled and de-angled, or vice versa. As already indicated, the implement chosen here is merely representative and many other types could be used with the same or a similar arrangement. If the arrangement is such that a motor comparable to the motor 24 remains with the implement and the couplings 32 and 34 are connectible to and disconnectible from such motor, then the motor need not be stored on the tractor as in Fig. 4. Nevertheless, the same conveniences are available. That is to say, with the hoses in the storage position of Figs. 2 and 4, the operator need only grasp the hoses and pull them rearwardly until the necessary connection is effected with the implement. If the distance between the implement and tractor is greater than that shown in a representative fashion in full lines in Fig. 1, there will be sufficient hose on the reel so that additional lengths thereof may be payed out. It will be understood, of course, that when the entire length of hose coiled on the reel is payed out, the hose will be placed under tension, because the reel-proximate ends thereof are connected to the reel hub enlargements 80 and 82. Of course, the reel cannot rotate any further and additional tensional forces imposed on the hoses will cause damage to either the hoses or reel or both. The invention features a safeguard against this possibility as will be brought out below.

Also, it is undesirable to effect a connection of the hoses to the implement while leaving the hoses under tension because of the energy stored in the re-wind spring 92. Accordingly, stop means is provided for limiting re-wind rotation of the reel. This will be described immediately below.

The stop means is tied in with measuring means operative in response to the paying out of a predetermined amount of hoses so as to become effective to leave extending from the reel a length of hose commensurate with the type of implement being used, it being understood that sufficient slack should be allowed in the hose to accommodate the articulate connection at 60—62—64. The particular type of measuring means shown here comprises a feeler 106 having at one end a pair of rollers 108 which respectively ride the hoses 28 and 30, so that the position of the feeler changes in accordance with increase and decrease in the diameter of the coil of hose on the reel 56. The other or rear end of the feeler is pinned or otherwise fixed to a transverse rockshaft 110 that is journaled at its opposite ends respectively in the support means 52 and 54. The stop means associated with the feeler or measuring means comprises a pair of elements, one in the form of a ratchet wheel 112, keyed to the reel hub 74, and the other of which comprises a pawl 114 loose on the rockshaft and having a typical one-way engagement with the ratchet wheel 112. That is to say, during pay-out rotation of the reel (counterclockwise as seen in Fig. 4, for example), the pawl merely ratchets over the ratchet wheel. However, the pawl is arranged to engage the ratchet wheel upon the reverse rotation of the reel. A spring 116 serves as biasing means to urge the pawl into engagement with the ratchet wheel 112. The pawl is preferably of two piece construction, comprising a portion 118 carried on the rockshaft 110 and a second portion 120 that is socketed in the portion 118 and cushioned by a spring 122. The purpose of the spring 122 is to cushion shocks imposed on the pawl 114 as it engages with the ratchet wheel 112 when reverse rotation of the reel occurs.

In order that engagement of the pawl 114 with the ratchet wheel 112 may be made dependent upon the paying out of a predetermined amount of hose, means is provided to co-ordinate the position of the feeler 106 with that of the pawl 114. For this purpose, the outer end of the rockshaft 110 has keyed thereto an actuating arm 124 which has rigid thereon a depending lug 126. An intermediate member 128 is loose on the rockshaft and has a pair of lugs 130 and 132. As best shown in Fig. 3, the lug 130 extends to the left and in front of the pawl 114, and the lug 132 extends to the right and behind the lug 126 on the actuating arm 124. The lug 132 is threaded and carries an adjustable stop 134, which is in the form of a handle that extends through an aperture 136 (Figs. 4 and 8) in the rear wall 44 of the box-like seat-supporting structure 40. Adjustment of the screw or stop 134 determines the point of engagement between the front end of the screw and the actuating lug 126. Hence, as the feeler 106 moves radially inwardly upon pay-out rotation of the reel, the rockshaft 110 moves angularly in a clockwise direction and the lug 126 approaches the front end of the screw 134. When the lug 126 engages the front end of the screw and pay-out rotation of the reel continues, the intermediate member 128 is also rocked in a clockwise direction and the other lug 130 picks up the pawl 114 and swings it rearwardly and clear of the ratchet wheel 112. Consequently, if the hose that has been unreeled is immediately released, so that reverse rotation of the reel 56 occurs, the pawl 114 cannot engage the ratchet wheel 112 until such amount of hose is re-wound as to move the feeler 106 radially outwardly into such position as to clear the lug 126 from the front end of the screw. In other words, the pawl is held out of engagement until a predetermined amount of hose is re-wound on the reel. This is equivalent to a situation in which the pawl 114 is prevented from engaging the ratchet wheel 112 until a predetermined amount of hose is left extending from the reel. The amount of free or extending hose may be varied by adjusting the screw 134. Consequently, engagement of the pawl with the ratchet wheel 112 may be accelerated or delayed, and for this reason the ratchet wheel 112 has several notches thereon, because in some cases it may be desired to have more or less free hose extending from the reel, depending upon variations in distances between the tractor and the particular type of implement.

The screw 134 also serves as manual means available to an operator at the operator's station 16 by means of which such operator may manually hold the pawl out of engagement with the ratchet wheel, irrespective of the position of the feeler 106. This feature is important in permitting complete re-wind of the hose to its storage status.

The safety feature incorporated in the invention, which prevents damage to the hose or other components of the arrangement, resides in the combination of means for cutting out forward progress of the tractor in response to the unreeling of a predetermined amount of hose in excess of that normally required.

As previously indicated, the agricultural tractor shown here is typical to the extent that the driving mechanism for propelling the tractor includes the internal combustion engine 14 and an adequate power train (not shown). The ignition system of the engine 14 is here under control of control means, designed in its entirety by the numeral 138, which may be any suitable make and break switch contained in a switch box 140 and having a control member 142 movable between normal and operating positions. Releasable retention of the member 142 in one or the other of its positions is accomplished by an over-center device including a spring 144. When the control member 142 is in the normal position shown in Fig. 5, switch mechanism (not shown) within the switch box 140 breaks the circuit through a pair of ground wires 146 to the ignition system of the engine 14. When the switch or control member 142 is moved to an operating position, which is approximately 30° in a counterclockwise direction from that shown in Fig. 5, the circuit in the grounding wires 146 is completed, thus grounding the ignition system of the engine and "killing" the engine so that forward progress of the tractor is halted. As previously indicated, the spring 144 operates as over-center means for releasably retaining the member 142 in either of its positions. A manually controlled reset member 148 extends through an appropriate aperture in the right hand wall 46 of the seat box 40 so that the operator may reset the control mechanism.

The actuating means for controlling the control means 138 comprises, in part, the arm 124 previously described as being keyed to the outer or right hand end of the rockshaft 110. In addition, the actuating means includes an arm extension 150, the position of which on the arm 124 may be selectively varied. This is accomplished by means of pivoting the extension 150 to the arm 124 at 152 and providing a plurality of apertures 154 in the rear portion of the extension 150 through any selected one of which a fastener 156 may be passed, thus enabling variations in the angle of the extension relative to the arm 124 about the pivot 154 and thus varying the spacing between the free end of the extension 150 and the control member 142. A trip or one-way driving device 158 is carried by the free end of the arm extension 150 by means of a pivot 160, and a tension spring 162 biases the device 158 rearwardly against a stop 164 so that the device 158 is capable, upon downward movement of the arm means 124—150, of tripping the control member 142 but is inoperative on upward movement of the arm means to effect the newly positioned control member. In other words, the driving device 158 has one-way effectiveness. A tension spring 166 biases the arm means downwardly and therefore biases the feeler 106 downwardly, because both the feeler and the arm means are keyed to the rockshaft 110.

As previously described, the intermediate member 128 is freely carried on the rockshaft and is controlled according to the position of the lug 126 on the actuating or arm means 124—150. It is also possible, as described, to manually release the pawl 114, since the control screw or stop 134 extends externally of the seat box structure 40. Retention of the pawl in released position via the lifted screw 134 is possible because of a releasable lock, best shown in Fig. 8, as comprising a pivoted member 168 capable of assuming the dotted line position when the member 134 is raised to the top of its aperture or slot 136.

*Operation*

Let it be assumed that the tractor is separated from the implement and that the operator is preparing to back the tractor into place for connection to the implement. The control means or cut out switch 138 will be in its normal position, conditioning the tractor driving mechanism for propelling the tractor. In this respect, it should be noted that any equivalent means for mobilizing and demobilizing the tractor driving mechanism will suffice for that purpose. The hoses are coiled in their storage status on the reel 56, as in Fig. 4, it being assumed for the present purposes that the free ends or couplers 32 and 34 of the hoses 28 and 30 are connected to the two-way motor 24. Upon completion of backing of the tractor to the implement, the tongue 64 of the implement is connected to the drawbar 62 of the tractor by the hitch or clevis pin 60.

Figure 8:
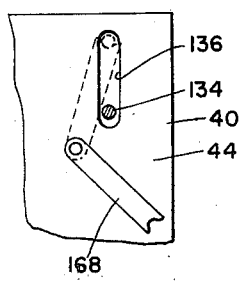
Fig. 8 is a fragmentary rear view as seen along the line 8—8 of Fig. 4.

With the hose completely coiled on the reel, the feeler or measuring means 106 is in its maximum uppermost position. The latch 168 for the adjusting member 134 is released or in its full-line position as shown in Fig. 8. The dismounted operator then detaches the motor 24 from its hanger 98 and carries it rearwardly to the implement, connecting it thereto at the mounting means 104—104. At the same time, the action of moving the motor to the implement causes the reel to pay out hose 28, 30. As the hose is payed out, the diameter of the coil on the reel of course decreases and the measuring member or feeder 106 moves radially inwardly. As the reel rotates, the pawl 114 simply rides over the notches in the ratchet wheel 112 until the pawl is held out by the feeder 106 via 126—134—130. Engagement between the pawl 114 and the intermediate member 128 is effective in only one direction; that is to say, the intermediate member can lift the pawl but the pawl cannot move the intermediate member. Hence, as the pawl ratchets over the ratchet wheel, the motion is not transmitted to the adjusting member 134, which therefore remains stationary. The adjustment of the member 134 relative to the rockshaft 110 and therefore relative to the lug 126 on the actuating arm 124 is such that the length of hose extending between the reel and the implement mounted motor 24 must be slightly greater than the straight line distance between those two points, which requirement is necessary to provide sufficient slack in the hose to accommodate the relative articulation between the tractor and implement. Accordingly, the operator pulls additional hose from the reel and causes the reel to rotate an additional angular increment. Preferably, the operator pulls out more hose than he really needs and after he releases the hose, the re-wind spring 92 will reverse rotation of the reel to re-wind the excess hose to an extent sufficient to cause the measuring member 106 to move radially outwardly. As the member does so move, it takes with it the lug 126, which had previously held the pawl 114 in a position of non-engagement relative to the ratchet wheel 112, which result follows from the fact that the lug 126 on the arm 124 engages the adjusting screw 134 and the lug 130 on the intermediate member 128 engages the pawl 114. As the lug 126 moves forwardly, the pawl return spring 116 moves the pawl forwardly and at just the predetermined moment that a sufficient amount of slack in the hose is provided, the pawl 114 will engage one of the notches in the ratchet wheel 112. At this point, it should be understood that if the arrangement were used solely with a particular type of implement, the ratchet wheel would need only one notch. However, since a wide variety of implements are normally used with the tractor, and the motor mountings thereon are at different distances from the tractor, the length of hose will vary and accordingly the ratchet wheel 112 requires additional notches. Other provision accommodating the same situations could be provided, of course. As the reel is halted in its normal or operative position, the shock of engagement of the pawl with the ratchet wheel is accommodated by the cushioning spring 122.

At this point, and noting that the implement 26 is in relatively close-coupled relationship to the tractor, there will be a normal length or amount of hoses 28 and 30 extending between the reel and the motor 24, and there will be an additional or reserve amount of hoses coiled on the reel. The connections of the hoses or equivalent power-transfer conductors to the power system of the tractor is complete by means of the connections previously described. Briefly, these are the secondary hoses or conductors 70 and 72, which afford means for connecting the interior chambers 66 and 68 of the reel to the power-supply system of the tractor. The main hoses 28 and 30 are connected at their inner or reel-proximate ends to the passage means 84 and 85, thus completing the power-transfer connections. The free ends of the hoses, whether considered as the couplers 32 and 34 or as the motor 24 are available for connection to or mounting on the implement, the implement representing a location relatively remote from the tractor and to which power transfer from the tractor is possible.

In normal operation, the tractor and implement will proceed together, the amount of slack in the hoses 28 and 30 being designed to accommodate articulation between the two vehicles as varying ground contour is encountered. In the event that the hitch pin 60 should break or should otherwise be released, which is not uncommon in heavy plowing conditions, the tractor will proceed forwardly without the implement. Of course, it follows that additional hose will be payed out from the reel 56 as the reel rotates in its pay-out direction. As it does so, the coil of hose will decrease in diameter and the feeler 106 will move radially inwardly, causing downward or clockwise movement of the actuating arm means 124—150. At a point prior to complete unreeling of the hose 28 and 30, the driving device or trip 158 will engage the switch arm or member 142, tripping that member to its operative position in which it grounds the ignition system of the engine 14 via the grounding wires 146. This demobilizes the driving mechanism of the tractor and progress of the tractor is halted. The operator then manually resets the control means or switch 138 by means of the reset member 148, which is necessary so that he can back the tractor to the implement to effect reconnection therebetween. As the tractor is backed, the reel automatically takes up the excess hose, because the feeler 106 in its down position keeps the pawl 114 away from the ratchet wheel 112 until the position of Fig. 1 is again achieved. After reconnection is effected, normal operation may be resumed.

When the motor is to be disconnected from the implement or the hoses are to be disconnected from the motor at the couplers 32 and 34, the operator, following either of the disconnections just mentioned, manually lifts the adjusting screw 134 to the dotted line position of Fig. 8. This displaces the pawl 114 relative to the ratchet wheel 112 and the re-wind spring reverses rotation of the reel so that all of the hose is returned to the reel in its storage status. The latch 168 may be moved to its dotted line position of Fig. 8 to retain the lifted position of the adjusting screw 134, leaving the operator's hands free to maintain a slight tension on the hoses as they are re-wound.

In addition to the adjustment provided by the adjusting screw 134 relative to the lug 126, there is an adjustment on the arm 124 and arm extension 150 for co-ordinating the function of the actuating means with the control means, whereby to cause demobilization of the tractor driving mechanism at the proper time, it being desirable to cut out the forward progress of the tractor prior to placing excess tensional forces on the connections of hoses 28 and 30 to the passage means 84 and 85.

The entire design is such that it may be readily incorporated in a tractor of which that shown in Fig. 1 is typical. In such a tractor, the seat box 40 normally houses the tractor battery. Preparation of the tractor for installation of the reel and conductor arrangement requires only the removal of the battery to some other suitable location. The box 40 thus provides an ideal enclosure or housing for the reel and conductor arrangement. It is, of course, necessary to provide suitable apertures in the wall structure of the box to accommodate the hoses 28 and 30, the adjusting member 134 and the reset member 148.

Other features and advantages of the invention, not categorically enumerated herein, will undoubtedly occur to those versed in the art, as will many modifications and alterations in the preferred embodiment disclosed, all of which may be achieved without departure from the spirit and scope of the invention.

What is claimed is:

1. For a tractor and an implement separably connected thereto for travel therewith, wherein the tractor has a power supply system and the implement has a power-receiving device remote from the tractor: the improvement comprising a support having means for the mounting thereof on the tractor; a reel journalled on the support; a coil of flexible power-transfer conductor stored on the reel and having an unwound length more than sufficient to extend between the reel and the implement device when the tractor and implement are interconnected, said conductor having means at one end for connection to the tractor power supply system and means at its other end for separable connection to the implement device; said reel being rotatable in a pay-out direction to furnish an amount of conductor in excess of that needed to extend normally between the reel and the implement device; re-wind means energizable to incur reverse rotation of the reel for rewinding the conductor on the reel; stop means operative to over-run during pay-out rotation of the reel and operative to inter-engage upon reverse rotation of the reel; measuring means operative in response to pay-out rotation of the reel in furnishing conductor in excess of said normal amount to prevent inter-engagement of the stop means so that reverse rotation of the reel is possible, said measuring means being operative to incur inter-engagement of said stop means upon reverse rotation of the reel commensurate with leaving said normal amount of conductor extending to the implement device and thereby to hold the reel in an intermediate position; and manual means for disengaging the stop means in said intermediate position of the reel so that additional reverse rotation of the reel is available to reel in the conductor for storage on the reel upon disconnection of the conductor from the implement device.

2. The invention defined in claim 1, including: control means selectively operative to incur travel and stoppage of the tractor and normally conditioned to incur tractor travel; and means connected to and automatically operative to condition the control means to stop the tractor in response to a predetermined pay-out of conductor in excess of said normal amount.

3. The invention defined in claim 1, in which: the measuring means includes a feeler riding the coil of conductor on the reel to control said one stop element as said coil increases and decreases in diameter during reverse and pay-out rotation of the reel.

4. The invention defined in claim 3, including: control means selectively operative to incur travel and stoppage of the tractor and normally conditioned to incur tractor travel; and means connected to the feeler and automatically operative to condition the control means to stop the tractor in response to diminution of coil diameter incident to a predetermined pay-out of conductor in excess of said normal amount.

5. The invention defined in claim 1, in which: the stop means comprises a ratchet wheel coaxial and rotatable with the reel and a pawl biased into engagement with the ratchet wheel.

6. For a tractor and an implement separably connected thereto for travel therewith, wherein the tractor has a power supply system and the implement has a power-receiving device remote from the tractor: the improvement comprising a support having means for the mounting thereof on the tractor; a reel journaled on the support; a coil of flexible power-transfer conductor stored on the reel and having an unwound length more than sufficient to extend between the reel and the implement device when the tractor and implement are interconnected, said conductor having means at one end for connection to the tractor power supply system and means at its other end for separable connection to the implement device; said reel being rotatable in a pay-out direction to furnish an amount of conductor in excess of that needed to extend normally between the reel and the implement device; re-wind means energizable to incur reverse rotation of the reel for rewinding the conductor on the reel; one-way stop means operative to over-run during pay-out rotation of the reel and positively operative to automatically inter-engage upon partial reverse rotation of the reel commensurate with leaving said normal amount of conductor extending to the implement device and thereby to hold the reel in an intermediate position; and manual means movably mounted on the support and connected to and for disengaging the stop means in said intermediate position of the reel so that additional reverse rotation of the reel is available to reel in the conductor to bring its free end more proximate to the reel.

7. The invention defined in claim 6, in which: means is provided for varying the point of inter-engagement of the stop means so as to vary the normal amount of conductor according to different reel-to-implement distances.

8. For a tractor and implement separably connected thereto for normal travel therewith, wherein the tractor includes a fluid power system and the implement has a fluid-operated device remote from the tractor, the improvement comprising: a support having means for the mounting thereof on the tractor and including a journal provided with a fluid chamber and means for effecting a fluid-transfer connection of the chamber to the tractor fluid system; a reel coaxially supported by the journal and having a fluid passage in communication with the chamber and a hose connector outlet leading from said passage; a coil fluid-conducting hose of an unwound length more than sufficient to extend from the reel to the implement device and having one end connected to the reel passage outlet and wound on the reel in a storage coil status such as to leave its other end free, said free end having means for connection to the implement device; said reel being rotatable in a pay-out direction to furnish an amount of hose in excess of that needed normally to reach the implement device; re-wind means energized to reverse the rotation of the reel to re-wind the hose on the reel in its storage coil status; one-way stop means operative to overrun during pay-out rotation of the reel and including cooperative elements positively inter-engageable automatically upon partial re-wind rotation of the reel to a normal position commensurate with leaving an uncoiled amount of hose sufficient only to extend normally between the reel and the implement device; and means movably mounted on the support and connected to one of the stop elements and manually operative to disengage the stop elements in the normal position of the reel to enable additional reverse rotation of the reel to re-wind the conductor to its storage coil status upon separation of the free end of the hose from the implement device.

9. The invention defined in claim 8, including: adjustable means connected to one of the stop elements for selectively varying the point in reverse rotation at which it engages the other stop so as to vary the normal amount of hose according to different reel-to-implement distances.

10. For a tractor and implement separably connected thereto for normal travel therewith, wherein the tractor includes a fluid power system and the implement has a fluid-operated device remote from the tractor, the improvement comprising: a support having means for the mounting thereof on the tractor and including a journal provided with a fluid chamber and means for effecting a fluid-transfer connection of the chamber to the tractor fluid system; a reel coaxially supported by the journal and having a fluid passage in communication with the chamber and a hose connector outlet leading from said passage; a coil fluid-conducting hose of an unwound length more than sufficient to extend from the reel to the implement device and having one end connected to the reel passage outlet and wound on the reel in a storage coil status such as to leave its other end free, said freed end having means for connecting to the implement device; said reel being rotatable in a pay-out direction to furnish an amount of hose in excess of that needed normally to reach the implement device; re-wind means energized to reverse the rotation of the reel to re-wind the hose on the reel in its storage coil status; one-way stop means operative to overrun during pay-out rotation of the reel and including cooperative elements positively inter-engageable automatically upon partial re-wind rotation of the reel to a normal position commensurate with leaving an uncoiled amount of hose sufficient only to extend normally between the reel and the implement device; means movably mounted on the support and connected to one of the stop elements and manually operative to disengage the stop elements in the normal position of the reel to enable additional reverse rotation of the reel to re-wind the conductor to its storage coil status upon separation of the free end of the hose from the implement device; and measuring means responsive to reverse rotation of the reel and connected to one of the stop elements for effecting inter-engagement of the stop element when reverse rotation of the reel is such as to leave said normal amount of hose extending to the implement device.

11. The invention defined in claim 10, in which: the measuring means includes a feeler riding the coil of hose and operative to effect inter-engagement of the stop elements when the diameter of the coil increases as the hose is re-wound to the point where said normal amount of hose extends to the implement device.

12. For a tractor having driving mechanism and a power supply system, the improvement comprising: support means for mounting on the tractor; a reel journaled on the support means and normally carrying a coil of flexible power-transfer conductor having one end connectible to the tractor power suuply system and having its other end free, said reel being rotatable in a pay-out direction to furnish selective amounts of conductor for use of the free end of the conductor at a location remote from the reel and said reel being rotatable in a reverse direction to reel in and coil the conductor; control means normally conditioned to incur normal operation of the tractor driving mechanism and operative to discontinue the normal effectiveness of that mechanism; and actuating means operative in response to pay-out action of the reel to a predetermined degree to operate the control means for discontinuing the normal effectiveness of the tractor driving mechanism.

13. The invention defined in claim 12, in which: the control means includes a control member movable from a normal position to an operating position and means releasably retaining said member in each position; the actuating means includes an actuating element movable toward the normally positioned control member from an idle position to an actuating position as the reel rotates in its pay-out direction, said element engaging said member and moving the member to its operating position when un-winding rotation of the reel attains said predetermined degree, said element being adapted to release said member after engagement therewith to permit return of the member to its normal position without interference from said element; and re-set means is provided for returning the control member to said normal position.

14. The invention defined in claim 13, in which: the actuating element includes a one-way driving device effective as the actuating element moves to its actuating position to engage and move the control member, said device being operative to over-run the control member upon return of the actuating element to its idle position as the reel is rotated in its reverse direction.

15. For a tractor having a power supply system: the improvement comprising: support means for mounting on the tractor; a reel journaled on the support means and normally carrying a coil of flexible power-transfer conductor having one end connectible to the tractor power supply system and having its other end free, said reel being rotatable in a pay-out direction to furnish a predetermined amount of conductor sufficient to enable use of the free end of the conductor at a location remote from the tractor and being additionally rotatable in said pay-out direction to furnish an additional amount of conductor; re-wind means energized to rotate the reel in the reverse direction to reel in the conductor to its coil form; a ratchet wheel coaxial and rotatable with the reel; a pawl pivoted to the support means and biased to be overrun by the ratchet wheel during pay-out rotation of the reel and to engage the ratchet wheel to stop reverse rotation of the reel; a measuring member movably carried by the support means and operative to hold the pawl from contact with the ratchet wheel in response to pay-out rotation of the reel conmmensurate with the furnishing of conductor in excess of said predetermined amount, said measuring member being operative to release the pawl for engagement with the ratchet wheel in response to reverse rotation of the reel commensurate with leaving said predetermined amount of conductor extending from the reel; and pawl-release means pivoted on the support coaxially with the pawl and having a one-way effective pawl-engaging portion for moving the pawl relative to the measuring member to release the ratchet wheel for further reverse rotation of the reel to reel in additional conductor.

16. For a tractor having a power supply system: the improvement comprising a support having means for the mounting thereof on the tractor; a reel journaled on the support; a coil of flexible power-transfer conductor stored on the reel and having an unwound length sufficient to extend between the reel and a location remote from the reel, said conductor having means at one end for connection to the tractor power supply system and means at its other end for use at such remote location; said reel being rotatable in a pay-out direction to furnish an amount of conductor to extend normally between the reel and such remote location; re-wind means energizable to incur reverse rotation of the reel for re-winding the conductor on the reel; one-way stop means operative to over-run during pay-out rotation of the reel and positively operative to automatically inter-engage upon partial reverse rotation of the reel commensurate with leaving said normal amount of conductor extending from the reel and thereby to hold the reel in an intermediate position; and manual means for disengaging the stop means in said intermediate position of the reel so that additional reverse rotation of the reel is available to re-wind more of the conductor for storage on the reel.

References Cited in the file of this patent

UNITED STATES PATENTS

| | | |
|---|---|---|
| 1,078,861 | Koch | Nov. 18, 1913 |
| 1,280,666 | Colwell | Oct. 8, 1918 |
| 1,958,626 | Krantz | May 15, 1934 |
| 2,391,141 | Dour et al. | Dec. 18, 1945 |
| 2,498,603 | Dyk | Feb. 21, 1950 |
| 2,626,552 | Oehler et al. | Jan. 27, 1953 |
| 2,629,630 | Roark | Feb. 24, 1953 |